3,375,267
AMINOTETRAFLUOROBENZONITRILE
Edwin Dorfman and Russell L. K. Carr, Grand Island, and Claude Thomas Bean, Jr., Niagara Falls, N.Y., assignors to Hooker Chemical Corporation, Niagara Falls, N.Y., a corporation of New York
No Drawing. Filed Jan. 21, 1965, Ser. No. 427,165
3 Claims. (Cl. 260—465)

ABSTRACT OF THE DISCLOSURE

This invention relates to aminotetrafluorobenzonitrile, a process for preparing this compound by the reaction of pentafluorobenzonitrile and ammonia, and a herbicidal method employing the invented compound.

---

Aminotetrafluorobenzonitriles may be conveniently prepared by reacting pentafluorobenzonitrile with ammonia and thereafter recovering the resultant, aminotetrafluorobenzonitrile. The general process of this invention may be adapted to the specific embodiment of cooling a reaction vessel to the temperature of liquid ammonia, charging liquid ammonia to the reaction vessel and while maintaining the reaction vessel at the temperature so obtained, gradually adding pentafluorobenzonitrile over a period of time, while agitating the resulting mixture, continuing agitation for a period after the total quantity of pentafluorobenzonitrile has been added and thereafter recovering aminotetrafluorobenzonitrile. It is desirable in this process that the reaction temperature be maintained at a range from about —80 degrees centigrade to about —30 degrees centigrade.

Alternatively, the compound of this invention may be prepared by a second process employing a solvent, but operating at a higher temperature. In this process the pentafluorobenzonitrile is dissolved in an inert solvent and charged to the reaction vessel. Thereafter, gaseous ammonia is passed into the reaction mixture until all of the pentafluorobenzonitrile has been reacted. The solvent is then removed from the aminotetrafluorobenzonitrile by conventional processing techniques. When a solvent process is utilized temperatures ranging from about —30 degrees to about +100 degrees centigrade and preferably from about zero to about 50 degrees centigrade may be employed.

The solvents utilized in the solvent process include inactive aromatic solvents, e.g. mononuclear aryls such as benzene, toluene and xylene; inactive ethers such as ethyl ether, dimethoxyethane and tetrahydrofuran.

In either process at least two moles of ammonia are employed for each mole of pentafluorobenzonitrile and preferably the molar ratio will be from 2 to 1 to 4 to 1. The preferred process of this invention utilizes the liquid ammonia process. The time of reaction is dependent upon the temperature employed and quantities and rate of addition of the nitrile. In all cases, it is desirable that the reaction be allowed to continue until all of the nitrile has been consumed. The nitrile is added to the reaction vessel at such a rate that the desired temperature ranges, mentioned above, are maintained.

The principal product of the foregoing process is the compound 4-amino-2,3,5,6-tetrafluorobenzonitrile although minor amounts of the isomers 2-amino and 3-amino tetrafluorobenzonitrile may be produced.

The aminotetrafluorobenzonitrile of this invention is effective as a post-emergent herbicide on both broad leaf and grassy types of weeds. This herbicide offers compatibility with a host of other heribicides, with insecticides and with various adjuvants and diluents well known to the art. Thus, this herbicide may be by itself or may be incorporated in liquid or solid formulations ranging from simple to complex. For example, if it is desired, this composition may be made as a liquid formulation by diluting, dispersing, dissolving or emulsifying with a surface active adjuvant or combination of these adjuvants in solvents such as petroleum hydrocarbons, ketones, esters or combinations thereof. Alternatively, the novel herbicide may be made up as solid formulations of powders, dust, wettable powders, granules, pellets using solid diluents such as talcs, clays, flours, starches, diatomaceous earths, mica, alkaline earth limes, carbonates and phosphates either finely divided, granular or pelleted in form. Unlike aliphatic and some aromatic acid chlorides, the compound of this invention is relatively stable to water and consequently, formulations of this compound can be dispersed in water for spraying without decompositions. The solid or liquid formulation facilitates handling in application and sometimes enhances herbicidal activity to more than an additive degree.

Solutions of the compound of the invention in mineral oils, kerosene, diesel oils, weed oils, and the like are particularly effective, giving rapid and thorough killing of mixed weed populations at rates and costs much lower than would be required when using either component alone.

The liquid compositions, whether solutions or dispersions of the active agents in a liquid solvent and also the wettable powder or dust compositions of this invention may contain as a conditioning agent one or more surface active agents in amount sufficient to render the composition readily dispersible in water. Within the term "surface active agents" are including wetting agents, dispersing agents, emulsifying agents, and the like. A satisfactory but not complete list of such agents is set forth in an article in "Soap and Chemical Specialities," volume 31, No. 7, pages 50–61; No. 8, pages 48–61; No. 9, pages 52–67; and No. 10, pages 48–67, 1955; volume 36, No. 10, pages 53–62; No. 11, pages 54–62; No. 12, pages 65–72, 1960; volume 37, No. 1, pages 51–58 and No. 2, pages 57–63, 1961. Other sources of adjuvant materials are set forth in Bulletin E–607 of the Bureau of Entomology and Plant Quarantine of the United States Department of Agriculture. Polyoxyethyl esters and ethers are particularly efficacious emulsifiers for these compositions.

While the manner and method of application of the invented composition is varied and largely dependent upon the climatic conditions, property, the weeds to be eradicated, equipment available and the convenience of the user, a preferred embodiment of this invention is to apply this herbicide as a spray after making it up as a liquid formulation containing, besides in addition to the active ingredients, a solvent quantity of petroleum hydrocarbon solvents and oils such as xylene, usually together with small quantities of an emulsifier such as a commercial polyoxyethylene ether and/or an alkyl aryl sulfonate. This type of mixture is emulsified with water in any convenient amount, sprayed on the weed population growing amidst the desired crop or other area where the weed growth is not desired. Alternatively, this composition may be applied as a solid formulation directly to the ground.

The rate of application cannot be precisely stated due to the varied degree of resistance possessed by the weed species in the crop, the stage of weed and crop growth, the soil type and climatic conditions, but in general, the rates will be at least one-quarter of a pound of aminotetrafluorobenzonitrile per acre and for reasons of cost will seldom exceed 100 pounds per acre with the preferred range falling within the one-quarter to 50 pounds per acre range.

The invention is illustrated by the following examples in which parts are given by weight and temperatures are in degrees centigrade.

Example 1

To a stirred excess of liquid ammonia at −30 degrees centigrade, 10 parts of pentafluorobenzonitrile were added with cooling. The slurry was stirred two hours and then was freed of ammonia in a stream of nitrogen. The solid residue consisted predominantly of crude 4-amino-2,3,5,6-tetrafluorobenzonitrile and ammonium fluoride. The 2- and 3-amino isomers were present in small amounts, i.e. less than ten percent. 9.9 parts of the crude product were obtained after washing with water to remove the ammonium fluoride and drying. The crude product melted at 88 to 93 degrees centigrade. The crude product was purified by sublimation, to a melting point 96 to 97 degrees centigrade.

Hydrolysis with 70 percent sulfuric acid gave decarboxylation to 2,3,5,6-tetrafluoroaniline, having a melting point of 23 to 26 degrees centigrade. Boiling of the tetrafluoroaniline with acetic anhydride and sulfuric acid for two minutes followed by precipitation with water gave the compound 2,3,5,6-tetrafluoroacetanilide with a melting point of 136 degrees centigrade.

An infrared absorption spectrum and nitrogen analysis confirmed the amino tetrafluorobenzonitrile structure.

Example 2

The purified product of Example 1 was made into a typical herbicidal oil emulsion by dissolving it in a minimal solvating amount of xylene and isophornone (3:1 ratio) and emulsifying with (less than 5 percent) of commercial emulsifiers based on polyoxyethylene ethers mixed with arylalkylsulfonates and was diluted with water. The aqueous dispersion was then suitable for spraying in the manner of known herbicidal compositions. The aqueous dispersion was applied at the rate of 4 pounds of 4-amino-2,3,5,6-tetrafluorobenzonitrile per acre to test plots containing young cucumbers and millet plants. The cucumbers have a physiological response typical of broad leaf weeds such as pigweed and lambs quarters. The millet has a physiological response typical of grassy weeds such as wild millet, fox tail and crab grass. After one week the test plots were inspected for herbicidal activity and both species of test plants were substantially totally killed.

Although certain preferred embodiments of the invention have been disclosed for the purpose of illustration it will be evident that various changes and modifications may be made therein without departing from the scope and spirit of this invention.

What is claimed is:
1. Aminotetrafluorobenzonitrile.
2. 4-amino-2,3,5,6-tetrafluorobenzonitrile.
3. A process for preparing 4-amino-2,3,5,6-tetrafluorobenzonitrile by charging a reaction vessel with liquid ammonia, maintaining the ammonia in a liquid state while adding pentafluorobenzonitrile while agitating the resulting mixture, reacting at a temperature range from about −80 degrees centigrade to about −30 degrees centigrade, and separating the 4-amino-2,3,5,6-tetrafluorobenzonitrile.

References Cited

UNITED STATES PATENTS

| | | | |
|---|---|---|---|
| 3,150,163 | 9/1964 | Pummer et al. | 260—465 |
| 3,284,484 | 11/1966 | Belt et al. | 260—465 |
| 3,290,353 | 12/1966 | Battershell et al. | 260—465 |

JOSEPH P. BRUST, *Primary Examiner.*